Jan. 27, 1925.
L. LEMOINE
ARRANGEMENT FOR OPENING AND CLOSING CYLINDERS FOR
COMPRESSED OR LIQUEFIED GAS
Filed Aug. 22, 1923
1,524,042
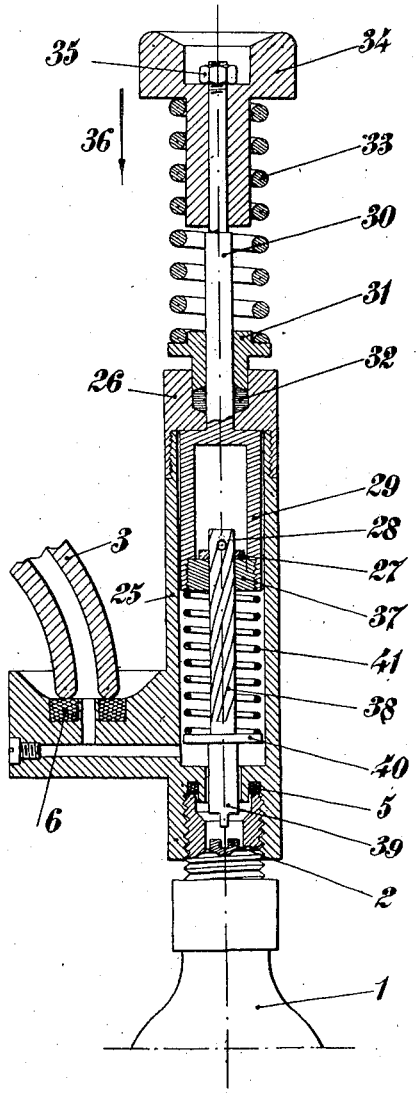
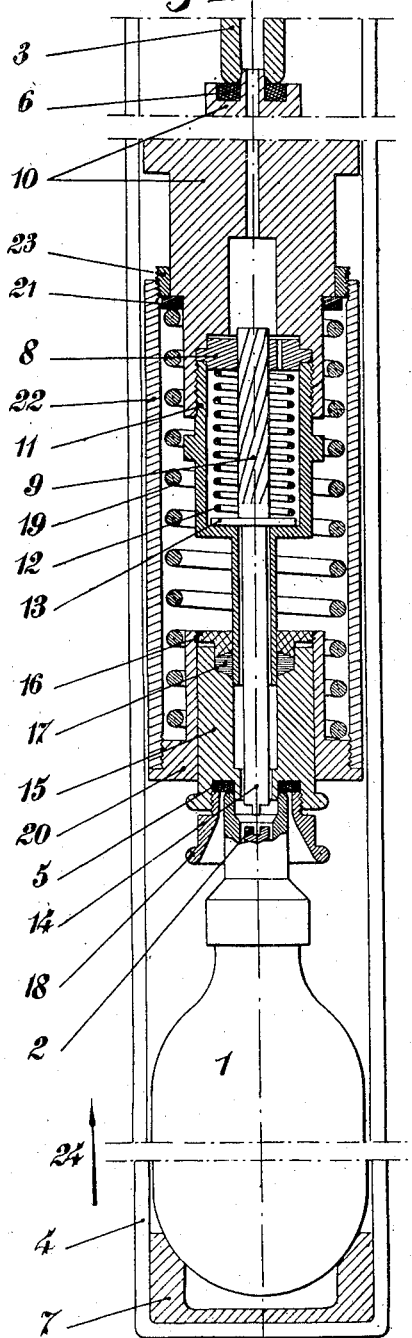

Patented Jan. 27, 1925.

1,524,042

UNITED STATES PATENT OFFICE.

LOUIS LEMOINE, OF PARIS, FRANCE, ASSIGNOR TO SOCIETE ANONYME D'APPLICATIONS DES GAZ LIQUEFIES, A LIMITED JOINT-STOCK COMPANY OF FRANCE.

ARRANGEMENT FOR OPENING AND CLOSING CYLINDERS FOR COMPRESSED OR LIQUEFIED GAS.

Application filed August 22, 1923. Serial No. 658,708.

*To all whom it may concern:*

Be it known that I, LOUIS LEMOINE, citizen of the Republic of France, residing at Paris, France, have invented certain new and useful Improvements in Arrangements for Opening and Closing Cylinders for Compressed or Liquefied Gas, of which the following is a specification.

My invention relates to an arrangement for the emptying and filling of capsules containing a compressed or liquefied gas and closed by a screw-stopper.

The invention has for its object to effect the opening and closing of the said screw-stopper through a simple pushing action directed in the axis of the stopper in such a way that the action which is intended to insure the joint at the end of the capsule can also be used to open it, so that but a single movement is required. Moreover, according to the invention, an exaggerated unscrewing of the stopper, which would entirely separate it from the capsule or would jam it against an abutment, is made impossible. Finally, after the emptying operation, with the arrangement according to this invention, the stopper can be closed with a small effort.

In the drawing, Fig. 1 is a sectional elevation of the preferred embodiment of the invention applied to the emptying of a capsule into a siphon bottle of seltzer water, Fig. 2 is a similar section through another embodiment for the same use.

According to Fig. 1, the capsule 1 containing the compressed gas is closed by the stopper 2 screwed thereon. 3 is the end of the spout of the siphon bottle into which the compressed gas shall be introduced. All the parts shown between the capsule 1 and the spout 3 of the siphon constitute an airtight connection, in accordance with the invention, for conducting the compressed gas from the capsule to the siphon and comprising the arrangement for opening and closing the capsule. 4 is a stirrup which is acted upon by any suitable means for moving the capsule 1 toward the spout 3 of the siphon with a view to first insuring the joint of the capsule 1 to the airtight connection by means of a plastic washer 5 and the joint of the spout 3 to the said connection by means of the plastic washer 6. A continuation of the movement of the stirrup 4 results in the opening of the capsule. The stirrup carries a jaw 7, which prevents the capsule from turning during the screwing and unscrewing of the stopper 2.

The parts intended to open and close the capsule comprises essentially a nut 8 and a screw 9 mounted one within the other. The nut 8 is integral with the airtight connection, and is clamped between the parts 10 and 11 screwed one upon the other in such a way that an airtight joint is formed. The nut 8 is bored so that communication is established between its two sides to permit the flow of gas. The screw 9 and the nut 8 have a rather elongated thread, i. e. of sufficiently great pitch, so that any action between them parallel to their axis will produce a relative movement and consequently also their rotation. The screw 9 and nut 8 are held in a certain relative position by a spring 12 abutting against the nut 8 and a disk 13 on the screw 9, which disk is arrested by the part 11. The screw 9 carries a screw-driver 14 integral therewith and adapted to engage the stopper 2, being positioned opposite the stopper when the capsule is put in place in the stirrup 4.

The part 11 is provided with a hollow cylindrical extension surrounding the screw-driver 14 and engaging two joint parts 15 and 16 telescoping therein. Between the parts 15 and 16 there is provided a plastic washer 17 separating them. The parts 15 and 16 and the washer 17 constitute a stuffing box, which is tightened by the action of the stirrup 4 when moving the capsule 1 toward the spout 3 of the siphon.

The part 15 which forms a portion of said stuffing-box, carries the washer 5 intended to insure the joint at the end of the capsule. This washer is held in place by a part 18 screwed into the part 15 and forming a guide for the proper positioning of the capsule 1.

The airtight connection between the latter and the siphon is thus constituted, when starting from the siphon, firstly by the set of parts 10, 8 and 11 rigidly connected together in an airtight manner and then by the stuffing-box 16, 15 and 17, which can move relative to the set 10, 8 and 11 in an airtight manner.

Between the set 10, 8 and 11 and the stuffing-box 16, 15 and 17 is provided a compressed coiled spring 19, which tends to separate the set 10, 8 and 11 from the stuffing-box. The spring 19 abuts at one end against a part 20 fixed to the part 16 and acting as a guide for the part 15, and at the other end against the part 10, where a washer 21 is interposed. The spreading of the spring 19 is limited by the following arrangement: A tubular part 22 joined to the part 20 encloses the spring 19. A screw-ring 23, screwed into the tubular part 22 insures the abutment thereof against the washer 21. At the same time, the ring 23 acts as a guide for the set of the parts 10, 8 and 11 along the part 10.

It is the force of the spring 19 which limits the action on the plastic washers 5, 6 and 17 and thus aids in the object to be obtained.

When the stirrup 4 is acted upon in the direction of the arrow 24, the three plastic washers 5, 6 and 17 are compressed, and the tightening of the connection between the capsule and the siphon is effected. When the action of the stirrup exceeds the tension previously given to the spring 19, the latter gives way, and the stopper 2 of the capsule 1 will meet the end of the screw-driver 14, which in turn participates in this relative movement and because of the turning of the screw 9 in the nut 8, receives a rotary movement. The point of the screw-driver 14 coming in front of the slot in the stopper 2 is made to engage the same by the expansion of the spring 12 and as the movement of the stirrup 4 continues, the stopper 2 will be unscrewed and the capsule 1 will empty its contents to flow to the siphon. The unscrewing of the stopper is limited by the limitation of the movement of the stirrup, and also by the abutment of the set 10, 8 and 11 against the stuffing-box 16, 17, 15 or by the abutting spirals of the spring 12 or those of the spring 19.

When the capsule 1 has been emptied, the action on the stirrup 4 in the direction of the arrow 24 is stopped, so that the expansion of the spring 19 will move the capsule in the opposite direction. Because of the expansion of the spring 12, the screw-driver remains engaged in the stopper 2, and through the movement relative to the nut 8 is given a turn, whereby the stopper 2 is closed. As soon as the latter is completely closed with a force corresponding to that of the spring 12, the screw-driver becomes disengaged from the stopper.

Fig. 2 shows another embodiment of the invention.

This embodiment is also shown applied to the emptying of a capsule 1 into a siphon of seltzer water, the spout of the siphon being indicated at 3. The airtight connection between the capsule and the siphon is constituted by the two parts 25, 26 screwed together so as to permit the introduction of inner parts. The part 25 is provided with a plastic washer 6, on which rests the spout 3 of the siphon being clamped thereon by any suitable means. Moreover, it is provided with a plastic washer, on which rests the end of the capsule 1 which is pressed against the washer by the screwing of the threaded head of the capsule into the part 25.

The arrangement for opening and closing comprises, as in the other embodiment, a screw 38, of high pitch, engaging a nut 37. The screw 38 terminates in a screw-driver 39 suited to the stopper 2, and carries a disk 40 acting as an abutment for the spring 41, which is compressed between the said disk and the nut 37, the expansion of the spring being limited by the ring 27 held in place by a pin 28 on the screw 38.

This set of parts is enclosed within the parts 25, 26. A part 29 integral with the nut 37 carries cylindrical stem 30 which extends through the part 26 in an airtight manner due to a stuffing-box constituted by the part 26, a part 31 forming the cap of the stuffing-box and a plastic washer 32. The tightening of the stuffing-box is obtained by a spring 33, which abuts against the cap 31 at one end and at its other end against a knob 34, movably mounted on the stem 30 and held in place by a nut 35. Through the knob 34 and the stem 30, the spring 33 therefore abuts against the part 26 because of the abutment against this part of the part 29. The spring 33 holds, and tends to move the parts referred to, in the position as shown in Fig. 2, insuring the air-tightness of the joint 32, and by the tightening of this joint, it prevents the stem 30 and therefore the nut 37 from turning. The spring 33 thus makes these parts one with the parts 25 and 26, but only to the point, where the action exerted thereon would become too great. The knob 34 being loose on the stem 30, the operator in turning the knob, can not, at the same time, cause the turning of the screw-driver, and thus exerting on the stopper too great turning efforts. The opening of the capsule 1 is obtained by pushing the knob 34 in the direction of the arrow 36, while the closure of the capsule is obtained by this pushing of the knob being stopped, in which case the spring 33 returns the parts to their initial position, as shown in Fig. 2.

I claim as my invention:

1. An arrangement for the emptying and filling of capsules with compressed or liquefied gas which are closed by a screw-stopper, comprising a screw and a nut in engagement with each other, and of a sufficiently high pitch to cause a relative and simultaneously a turning movement by an action being exerted on the said parts in the direction of their axes, and a screw-driver carried by one of the said parts and adapted to engage the screw-stopper of the capsule.

2. In an arrangement as specified in claim 1, a spring provided between the said screw and nut and tending to cause their relative movement for the purpose of closing the stopper of the capsule, and an abutment limiting the extent of the relative movement of the said parts.

3. In an arrangement as specified in claim 1, an air-tight connection provided between the capsule and the receptacle to receive the gas and enclosing the said parts, and a stuffing-box through which the relative movement of the screw and the nut is controlled from the outside of the said connection and transmitted to the interior thereof, the said stuffing-box thus insuring the air tight condition during the movement.

4. An arrangement for the emptying and filling of capsules containing compressed or liquefied gas and closed by a screw-stopper, comprising a connection between the capsule and the recipient of the gas composed of two parts, the one extending the capsule and the other extending the recipient, a stuffing-box through which the said two parts engage each other, a mutually engaging screw and nut and a spring interposed between the said nut and screw, the part extending the recipient enclosing the said screw, nut and spring, the nut being fixed to the said part, a screw-driver carried by the said screw and passing through the said stuffing-box, its free end being close to the screw-stopper of the capsule, a spring surrounding the said two parts of the said connection and tending to move them apart, a tubular part limiting said movement and enclosing the said spring, the said tubular part being united to the part extending the capsule, a washer in said tubular part, a washer on the outside of the part extending the recipient, the said washer within the said tubular part gliding on a cylindrical portion of the part extending the recipient and acting as a guide during the relative movement of the said two parts of the said connection, a stirrup for moving the capsule toward the recipient and a means in said stirrup for preventing the capsule from turning.

In testimony whereof I affix my signature.

LOUIS LEMOINE.